(12) United States Patent
Gupta et al.

(10) Patent No.: US 8,938,342 B1
(45) Date of Patent: Jan. 20, 2015

(54) ASYNCHRONOUS-TO-SYNCHRONOUS CLUTCH TORQUE EXCHANGE IN A HYBRID ELECTRIC VEHICLE

(71) Applicant: GM Global Technology Operations LLC, Detroit, MI (US)

(72) Inventors: Pinaki Gupta, Novi, MI (US); Lawrence A. Kaminsky, White Lake, MI (US); Sean W. McGrogan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1 day.

(21) Appl. No.: 13/950,794

(22) Filed: Jul. 25, 2013

(51) Int. Cl.
*G06F 7/00* (2006.01)
*B60W 10/11* (2012.01)
*B60W 10/02* (2006.01)

(52) U.S. Cl.
CPC ............... *B60W 10/11* (2013.01); *B60W 10/02* (2013.01)
USPC ............. 701/68; 477/143; 477/156; 477/159; 477/176; 477/180; 192/3.58; 192/3.63; 192/103 F

(58) Field of Classification Search
CPC ...... F16H 61/02; F16H 61/68; B60W 10/105; B60W 10/02; B60W 20/10; F16D 48/06; F16D 48/062; F16D 2500/70426; F16D 2500/70428; F16D 2500/1066; F16D 2500/1085; F16D 2500/1087; F16D 2500/30406; F16D 2500/3109
See application file for complete search history.

(56) References Cited

U.S. PATENT DOCUMENTS

| 8,221,285 B2 * | 7/2012 | Heap et al. | 477/5 |
| 8,282,526 B2 * | 10/2012 | Heap et al. | 477/5 |
| 8,296,027 B2 * | 10/2012 | Heap et al. | 701/67 |
| 8,414,449 B2 * | 4/2013 | Heap et al. | 477/5 |

* cited by examiner

*Primary Examiner* — David D Le
(74) *Attorney, Agent, or Firm* — Quinn Law Group, PLLC

(57) ABSTRACT

A vehicle includes torque sources, a transmission, and a controller programmed to execute a method. In executing the associated method, the controller determines whether continuous output torque is required through a torque exchange. When continuous output torque is required, the controller synchronizes and fills the oncoming clutch, estimates capacity of the oncoming clutch, and expands a short-term torque capacity of the oncoming clutch during the torque exchange, doing so in response to a control objective having a threshold priority. Onset of the torque exchange delays until the short-term torque capacity is sufficient for receiving all torque load from the offgoing clutch without affecting output torque. The controller asynchronously controls the offgoing clutch and synchronously controls the oncoming clutch through the torque exchange, and loads the synchronous oncoming clutch via an expanding set of long-control torque capacity limits as a function of a simultaneously exhausting of the offgoing clutch load.

16 Claims, 3 Drawing Sheets

ASYNCHRONOUS-TO-SYNCHRONOUS CLUTCH TORQUE EXCHANGE IN A HYBRID ELECTRIC VEHICLE

TECHNICAL FIELD

The present disclosure relates to a method and a system for exchanging torque from an asynchronous to a synchronous clutch in a hybrid electric vehicle.

BACKGROUND

A torque exchange between clutches of a conventional automatic vehicle transmission is closely controlled via a control module, e.g., a transmission control module (TCM). The control module of such a transmission commands offload of torque capacity of the particular clutch that is associated with a current speed ratio, i.e., the offgoing clutch, and simultaneously applies another clutch associated with a desired new speed ratio, i.e., the oncoming clutch. Torque from one or more sources, typically an internal combustion engine and/or one or more electric traction motors, is then exchanged from the offgoing clutch to the oncoming clutch in order to complete the shift.

The clutches of a transmission may be described in terms of the mode that is used to establish their control. Thus, the offgoing and oncoming clutches may be referred to as "synchronous clutches" in a typical synchronous shift. In an oncoming synchronous clutch, clutch pressure remains fully exhausted while the clutch is still slipping. Clutch pressure is applied only after the synchronous speed is attained. By way of contrast, for an offgoing asynchronous clutch, some amount of clutch pressure is applied to the clutch assembly even after the clutch slips. As a result, an asynchronous clutch is able to produce output torque while slipping.

A hybrid transmission lacks a fixed speed ratio. In other words offloading/oncoming of the clutches of a hybrid transmission are generally not required because of the speed ratio. Also, in a hybrid transmission one may transition from a gear state to a mode in which there is one offgoing clutch. Thus, not all shifts in a hybrid transmission have an offgoing-oncoming clutch combination.

SUMMARY

A hybrid electric vehicle is disclosed herein. The vehicle includes a controller, e.g., a hybrid control processor, and a plurality of fluid-actuated clutches. For a requested shift, one of the clutches is designated as the offgoing clutch, while another of the clutches is designated as the oncoming clutch, with both terms described above. The shift involves a torque exchange or "handoff" from the offgoing clutch to the oncoming clutch. The controller is programmed or otherwise configured to selectively execute steps of an associated method whenever a driver requires continuous output torque through the shift event, e.g., a shift through neutral.

When the present method is executed, the controller asynchronously controls the offgoing clutch, i.e., the offgoing asynchronous clutch, while the oncoming clutch is synchronously controlled. Thus, the oncoming clutch is referred to herein as the oncoming synchronous clutch. As part of the method, the controller also calculates and enforces short-term and long-term torque limits for the oncoming synchronous clutch. The torque limits are selectively enforced commencing at the end of a period of a phase of asynchronous offgoing clutch control, and continue until the start of a subsequent phase of synchronous torque control, as is explained in detail herein. Thus, selective execution of the present method may help to improve overall drive quality when a driver requests continuous output torque through the shift.

In particular, a hybrid electric vehicle is disclosed herein that includes a plurality of torque sources, a transmission, and a controller. The controller, which is in communication with the transmission and the torque sources, is configure, i.e., programmed in software and equipped in hardware, to determine whether continuous output torque is required through a duration of a torque exchange commanded via a requested shift. When the continuous output torque is required, the controller is operable to synchronize and fill the oncoming clutch, estimate a hydraulic capacity of the oncoming clutch, and temporarily expand a short-term torque capacity of the oncoming clutch during the duration of the torque exchange in response to a control objective having a threshold priority. The controller also delays onset of the torque exchange until the short-term torque capacity of the oncoming clutch is sufficient for receiving all torque load from the offgoing clutch without affecting the continuous output torque. Then, the controller asynchronously controls the offgoing clutch through the duration of the torque exchange, synchronously controls the oncoming clutch through the duration of the torque exchange, and loads the synchronous oncoming clutch via an expanding set of long-control torque capacity limits as a function of a simultaneously exhausting the offgoing clutch load.

The vehicle may include an electric motor and an internal combustion engine as the plurality of torque sources. In such a case, the controller is configured to offload the offgoing clutch using a combination of torque from the electric motor and the engine while maintaining the output torque at a continuous level.

A transmission assembly for the hybrid electric vehicle includes the gear set, the plurality of clutches, and the controller described above. An associated method for shifting the transmission is also disclosed that includes executing the functionality of the controller structure noted above.

The above features and advantages and other features and advantages of the present invention are readily apparent from the following detailed description of the best modes for carrying out the invention when taken in connection with the accompanying drawings.

DETAILED DESCRIPTION

Figure 1:
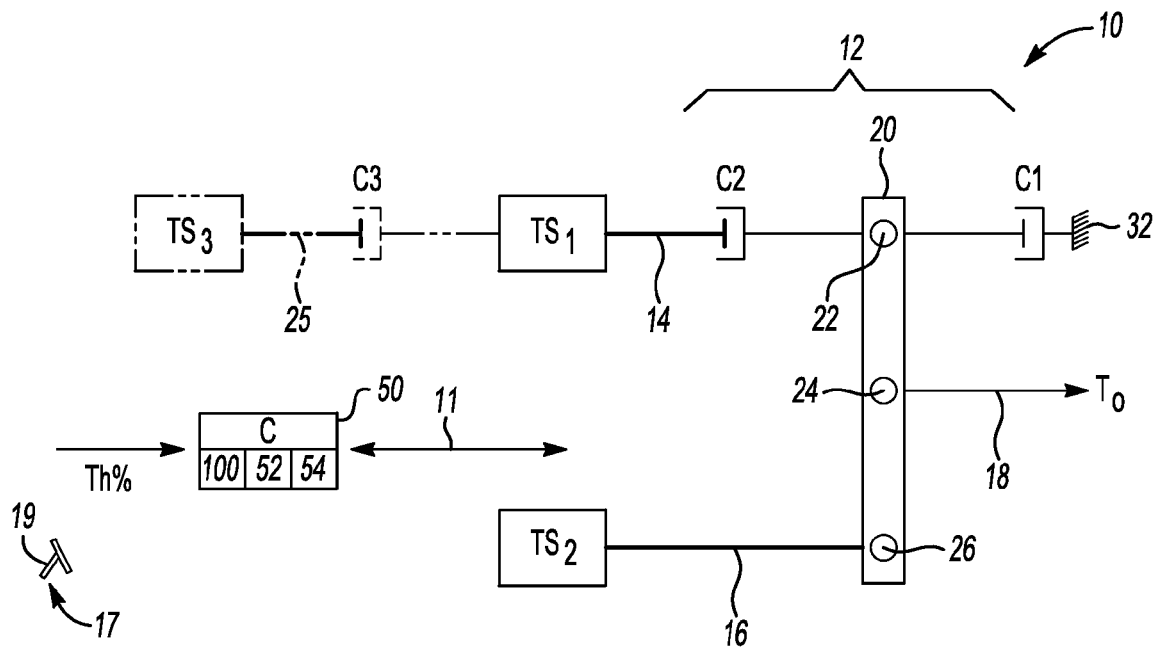
FIG. 1 is a schematic illustration of a vehicle having an automatic transmission and a controller, the latter of which executes steps of the present method to thereby control an offgoing asynchronous-to-oncoming synchronous clutch torque exchange.

Referring to the drawings, wherein like reference numbers correspond to like or similar components throughout the several figures, and beginning with FIG. 1, an example hybrid electric vehicle 10 is shown that includes a controller (C) 50.

The controller 50 communicates with various components of an automatic transmission 12 via control signals (double headed arrow 11), e.g., signals transmitted and received over a controller area network (CAN) bus. The controller 50 is configured, via associated hardware and software elements as described herein, to selectively execute steps of a shift control method 100, an example of which is described below with reference to FIGS. 2 and 2A.

Execution of the method 100 allows the controller 50 to control a predetermined shift event, a term which is defined herein as a torque exchange or "handoff" occurring between an asynchronously-controlled offgoing clutch and a synchronously-controlled oncoming clutch when a driver of the vehicle 10 of FIG. 1 requires continuous output torque through the commanded shift and immediately thereafter, for instance a power-on shift through neutral.

Figure 2A:
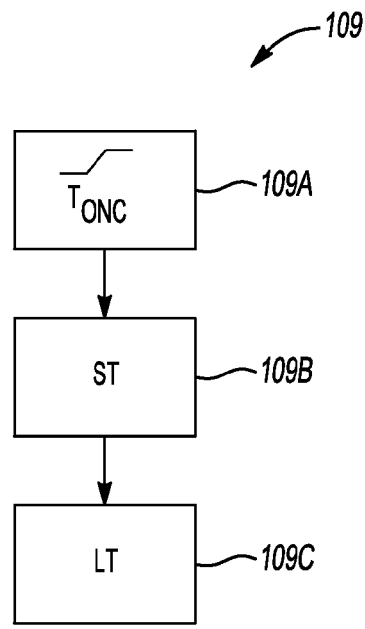
FIG. 2A is another flow chart describing an optional embodiment for a portion of the method shown in FIG. 2.

The present control approach is intended to improve drive quality by closely coordinating the torque offloading of a slipping clutch, i.e., the asynchronous offgoing clutch, with torque loading of a locked synchronous oncoming clutch. Most hybrid vehicle shift events, as noted above, are synchronous in nature. On rare occasions, however, an asynchronous shift may be required, with one such situation being when a driver requires continuous output torque through the shift. The torque exchange between the asynchronous and synchronous clutches is thus conducted under these circumstances in the manner set forth herein with reference to FIGS. 2, 2A, and 3. FIG. 3 in particular illustrates application of short-term (ST) and long-term (LT) torque limits, which are calculated and enforced by the controller 50, as the asynchronous offgoing clutch exhausts.

Input torque to the transmission 12 of FIG. 1 is provided via torque sources $TS_1$ and $TS_2$, and optionally via another torque source $TS_3$ as shown in phantom. One or more of the torque sources $TS_1$, $TS_2$, and/or $TS_3$ may be a high-voltage electric traction motor, e.g., a polyphase electric machine rated for between 60 VDC and 300 VDC or more depending on the application. Another of the torque sources $TS_1$, $TS_2$, or $TS_3$ may be an internal combustion engine. An output shaft 25 of the torque source $TS_3$ may be selectively coupled to the torque source $TS_1$ via a rotating clutch C3 as shown. Such an embodiment may allow for provision of electric assist to the torque source $TS_3$ by the torque source $TS_1$.

The transmission 12 may include, in a simplified non-limiting embodiment, a single planetary gear set 20 having nodes 22, 24, and 26. In such an embodiment, the torque sources $TS_1$ and $TS_3$ may deliver input torque to node 22 via an input shaft 14 and another rotating clutch C2. Torque source $TS_2$ may be continuously connected to node 26 of the planetary gear set 20 via an interconnect member 16, with the torque source $TS_2$ delivering motor torque as needed to node 26 of the transmission 12. Node 22 may also be selectively connected to a stationary member 32 of the transmission 12 via a clutch C1, i.e., a braking clutch. Any of the clutches C1, C2, or C3 may act as the oncoming or offgoing clutch for a given shift, as could any clutches used in other embodiments of the transmission 12, as will be appreciated by those having ordinary skill in the art.

The transmission 12 of FIG. 1 also includes an output shaft 18. The output shaft 18 ultimately conveys output torque (arrow $T_O$) from the transmission 12 to a set of drive wheels (not shown). The clutches C1, C2, C3 can be selectively actuated via electro-hydraulic controls (not shown), including for instance a fluid pump, valves, fittings, hydraulic hoses, and the like. Such structure is well known in the art, and thus is omitted from FIG. 1 for illustrative simplicity.

The controller 50 shown in FIG. 1 is configured to execute associated process steps, i.e., is programmed in software and equipped in hardware, such that the controller 50 selectively executes code embodying the present method 100. For instance, the controller 50 may execute, via a processor 52, a set of computer code or instructions that is stored on tangible, non-transitory memory 54. This occurs during a pre-determined shift of the transmission 12, particularly when continuous output torque is required through the shift and immediately thereafter. The controller 50 may be configured as a microprocessor-based computer device having, as the memory 54, any required read only memory (ROM), random access memory (RAM), electrically-programmable read-only memory (EPROM), etc. The controller 50 may also include logic circuitry including but not limited to proportional-integral-derivative (PID) control logic, a high-speed clock (not shown), analog-to-digital (A/D) circuitry, digital-to-analog (D/A) circuitry, a digital signal processor, and the necessary input/output (I/O) devices and other signal conditioning and/or buffer circuitry.

The controller 50 of FIG. 1 may be in communication with a throttle sensor 19 positioned with respect to an accelerator pedal 17. The throttle sensor 19 measures a level of travel or apply pressure of the accelerator pedal 17, and outputs a throttle signal (arrow Th %) corresponding to the measured level or travel or force of the accelerator pedal 17. The throttle signal (arrow Th %) is received by a transceiver (not shown) of the controller 50.

The controller 50 thereafter processes the received throttle signal (arrow Th %) to thereby determine a driver requested torque, and thus to determine when continuous output torque is desired through the shift. When a driver requires such continuous output torque, the ensuing torque exchange is closely coordinated to ensure a smooth transition from a designated asynchronous offgoing clutch to a designated synchronous oncoming clutch, either of which can be one of the clutches C1, C2, or C3 described above, or other clutches in different embodiments of the vehicle 10. The controller 50 may, as part of the present control approach, offload the offgoing clutch using a combination of torque from an electric motor and engine while maintaining output torque at a continuous level. This shift control functionality of the controller 50 of FIG. 1 will now be explained with reference to the remaining Figures.

Figure 2:
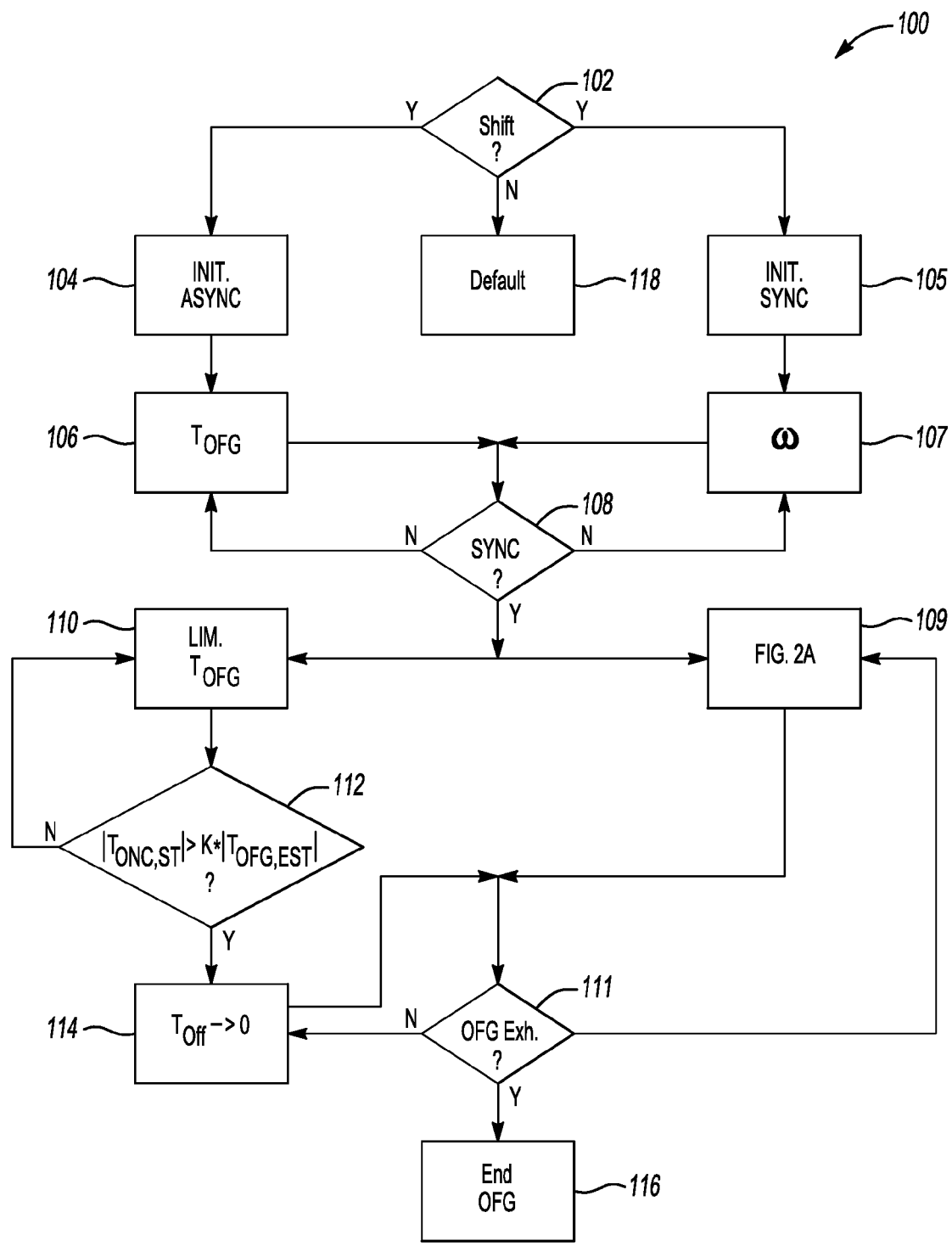
FIG. 2 is a flow chart describing an example method for executing an offgoing asynchronous-to-oncoming synchronous clutch torque exchange.
Figure 3:
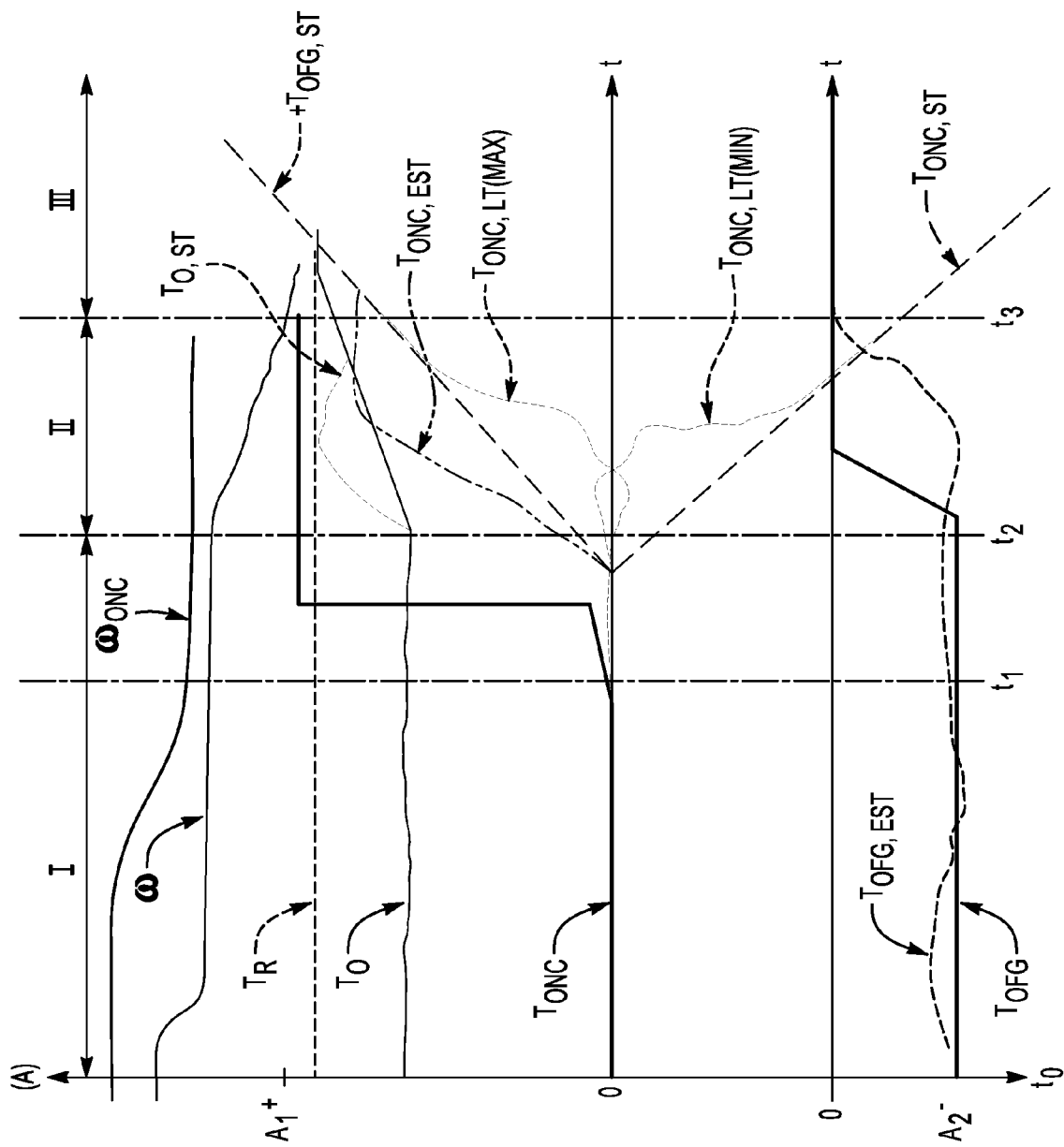
FIG. 3 is an example time plot illustrating an application of the method shown in FIGS. 2 and 2A, and illustrating enforcement of short-term and long-term torque limits on the oncoming synchronous clutch.

Referring to FIG. 2, the method 100 for executing an asynchronous-to-synchronous clutch shift begins at step 102, wherein the controller 50 of FIG. 1 determines whether such a shift is requested. As noted above, most shifts of a hybrid electric transmission are synchronously controlled. As a result, the oncoming and offgoing clutches are both synchronous clutches, with various control approaches being available to coordinate the torque exchange in this instance. Therefore, the method 100 may automatically default to step 118 whenever a synchronous shift is required at step 102, i.e., whenever continuous output torque is not required through the impending shift. Otherwise, the method 100 proceeds to steps 104 (asynchronous control) and 105 (synchronous control).

At step 104, the controller 50 of FIG. 1 identifies which of the various clutches, e.g., clutches C1, C2, or C3 of FIG. 1, or other clutches in different embodiments of the vehicle 10 shown in the same Figure, is to function as the designated offgoing clutch for the impending shift. Step 104 may include setting a flag in memory 54 of the controller 50 of FIG. 1, the setting of which triggers execution of the subsequent steps in the method 100 flowing from step 104. The method 100 proceeds to step 106 after completion of step 104.

Step 105 of the method 100 entails initiating synchronous control (INIT. SYNC) of the designated oncoming clutch for the shift. Step 105, like step 104, may entail setting a flag in memory 54 of the controller 50, the setting of which triggers execution of subsequent steps in the method 100. The method 100 proceeds to step 107 after completion of step 105.

At step 106, the controller 50 commands offgoing clutch torque at a level that corresponds to the requested axle torque, which may be determined by the controller 50 as a function of the received throttle signal (arrow Th %) shown in FIG. 1. Step 106 may entail calculating a corresponding offgoing clutch torque command, accessing a calibrated lookup table, processing the requested torque through a model, and/or any other suitable approach. The method 100 proceeds to step 108 upon completion of step 106.

At step 107, the controller 50 predicts when synchronous speed will be attained, e.g., via clutch speed measurement or calculation of the clutches, and also monitors the clutch slip speed and fill rate. While this is occurring, the method 100 proceeds to step 108.

Step 108 entails determining, via the controller 50, whether the oncoming synchronous clutch has reached synchronous speed, e.g., via direct speed measurement or indirect methods such as speed calculation. Steps 106 and 107 are repeated if synchronous speed has not yet been reached. Prior to this point, the synchronous and asynchronous control portions of the method 100 run independently of each other. The controller 50 proceeds to steps 109 and 110 once synchronous speed has been reached.

At step 109, the controller 50 of FIG. 1 executes oncoming synchronous clutch control which occurs in three steps. Referring briefly to FIG. 2A, at step 109A the controller 50 of FIG. 1 ramps a torque command to the oncoming clutch ($T_{ONC}$) at a calibrated rate. Alternatively, this step may entail ramping a pressure command in a similar manner, with torque and position being related, for instance, via a calibrated torque-to-pressure table. This step results in an increase in estimated torque capacity, e.g., as estimated by the controller 50 as a function of the torque command ($T_{ONC}$), whether via lookup table, modeling, formula, or otherwise.

Step 109B follows immediately after step 109A. Here, the controller 50 calculates positive (+) and negative (−) short-term (ST) torque capacity limits for the oncoming clutch. These short-term limits may be bounded by the estimated torque from step 109A in the manner described below with reference to FIG. 3. Such limits are enforced by the controller 50 during the torque exchange phase of the commanded shift. While the short-term torque capacity limits used herein are not preferred in ordinary operation, the controller 50 selectively enables their use as a torque reserve on an as needed basis, for instance when a transient output torque spike or bump is necessary to protect hardware, e.g., a hybrid motor, battery power constraints, etc., which are of a higher priority than output torque, requires access to the output torque reserve provided by the ST torque capacity limits.

Step 109C follows step 109B. In this step, the controller 50 of FIG. 1 calculates long-term (LT) torque capacity limits for the synchronous oncoming clutch. These long-term torque capacity limits are shown along with the short-term limits in FIG. 3. The LT torque capacity limits provide preferred torque boundaries or recommended limits, which ultimately merge with the short-term limits at the completion of the torque exchange. Step 109C may entail subtracting a torque capacity of the synchronous clutch clutch, which is the equivalent of the current asynchronous load from output torque, from the short-term torque capacity limits ($ST_{ONC}$) determined at step 109B. The synchronous and the asynchronous clutches have different transmission ratios associated with them when calculating the effect on output torque, i.e., To=K×clutch load. The method 100 proceeds to step 111 of FIG. 2 after completing steps 109A-C of FIG. 2A.

At step 110 of FIG. 2, the controller 50 limits the torque command ($T_{OFG}$) to the asynchronous offgoing clutch used in the present shift control event. Step 110 may entail temporarily preventing the torque command to the asynchronous offgoing clutch from increasing in magnitude until the synchronous oncoming clutch is ready to handle the entire clutch load for the shift. The method 100 then proceeds to step 112.

Step 111, which is arrived at from steps 109 and 114, entails determining whether the asynchronous offgoing clutch has fully exhausted. This may entail determining when a modeled capacity of the offgoing asynchronous clutch indicates is fully exhausted. If the asynchronous offgoing clutch has not yet exhausted, the method 100 proceeds to step 114 and 109 for the asynchronous and synchronous clutches, respectively. The method 100 otherwise proceeds to step 116.

Step 112 involves making a comparison, via the controller 50, of two calculated absolute value torque limits: (i) the short-term (ST) clutch torque capacity for the synchronous oncoming clutch ($T_{ONC,ST}$), and (ii) an estimated torque for the offgoing clutch ($T_{OFG,EST}$), with the latter value optionally multiplied by a calibrated gain (K). In this instance, $K=K_{OFG}/K_{ONC}$, which provides an output torque equivalent of the asynchronous offgoing clutch per unit of synchronous oncoming clutch torque. A truth test for the following mathematical relationship, where || represents absolute value, may be programmed into memory 54 of controller 50 shown in FIG. 1 and evaluated by the processor 52:

$$|T_{ONC_{ST}}| > K|T_{OFG,EST}|$$

If this particular relationship holds true, then the method 100 proceeds to step 114. Otherwise, the controller 50 repeats step 110.

At step 114, the controller 50 of FIG. 1 ramps the torque command ($T_{OFG}$) of the asynchronous offgoing clutch to zero. This step is performed at a calibrated rate. Once the torque command reaches zero, the clutch is commanded to the "exhaust completely position", i.e., via control of a variable force control solenoid valve or other control solenoid feeding the clutch. The method 100 then proceeds to step 111 which is described above.

Step 116, which may be arrived at from step 111 only upon determination of successful exhaustion of the asynchronous offgoing clutch, e.g., by observing an estimated or modeled torque capacity of the offgoing clutch in logic, entails terminating the asynchronous offgoing clutch control that was originally instituted at step 104. Control of the synchronous oncoming clutch thereafter may continue in the default manner, e.g., via PID-based feedback, model-based feedforward torque, and/or position controls, while still adhering to the long-term torque capacity limits depicted in FIG. 3. The shift, and thus the method 100, are complete.

At step 118, the controller 50, having earlier determined at step 102 that an asynchronous-to-synchronous shift is not presently required, executes default control over the impending shift. Such control may take many forms, with synchronous shift control of both the offgoing and oncoming clutches being well known in the art and outside of the scope of the present control approach. The method 100 is thus finished at step 118.

Referring to FIG. 3, various vehicle control parameters are depicted to further illustrate the control method 100 described above. The amplitudes (A) of the parameters are plotted with respect to the vertical axis, while time (t) is plotted separately on a pair of horizontal axes to illustrate the control timelines for the synchronous oncoming clutch and the asynchronous offgoing clutch.

The asynchronous phase (I) of the present clutch control method 100 begins upon commencement of a requested shift at $t_0$ and ends at $t_2$. Phase I is immediately followed by a torque exchange phase (II) between $t_2$ and $t_3$, wherein clutch torque load, i.e., clutch capacity, is offloaded from the asynchronous offgoing clutch to the synchronous oncoming clutch. This offloading occurs within the applied constraints of the long-term and short-term torque capacity limits described above. A synchronous torque application phase (III) commences at $t_3$, whereupon the asynchronous offgoing clutch is fully exhausted and offloaded.

Slip of the offgoing clutch, which is represented in FIG. 3 as trace $\omega_{OFG}$, is held constant until $t_2$ before being gradually ramped to zero during the synchronous torque application phase (Phase III). Slip of the oncoming clutch, trace $\omega_{ONC}$, is synchronized at a calibrated profile, e.g., an S curve. The torque request (trace $T_R$) corresponding to the received throttle signal (arrow Th %) remains positive and substantially level throughout Phases I-III of the shift, although this trajectory is merely representative. That is, temporary spikes in throttle may be experienced over this duration and automatically accounted for via selective resort to the short-term torque capacity limits described below. Likewise, transmission output torque ($T_O$) remains constant until the completion of Phase II of the shift. The output torque ($T_O$) begins to ramp up after the torque exchange phase (Phase II) of the shift is complete at $t_2$. Trace $T_{O,ST}$ of FIG. 3 illustrates a typical output torque profile in the absence of the present method 100 and enforced long-term torque capacity limits.

Clutch torque commands issued by the controller 50, e.g., hydraulic pressure commands to the clutches, or the allowed actual clutch load by the engine and motors (e.g., $TS_{1-3}$ in FIG. 1) involved in a torque exchange, are represented in FIG. 3 as traces $T_{ONC}$ and $T_{OFG}$ for the synchronous oncoming and asynchronous offgoing clutches, respectively. The asynchronous offgoing clutch is plotted in an opposite torque direction relative to the oncoming clutch, i.e., with the offgoing clutch torque being negative in FIG. 3 and thus "rising" toward zero as viewed in FIG. 3. The modeled or estimated torque of the asynchronous offgoing clutch is represented as trace $T_{OFG,EST}$. The actual clutch command is shown as trace $T_{OFG}$, which is at an amplitude of $A_2-$. This amplitude is determined by the energy capacity and the control slip of the offgoing clutch. Offgoing torque is ramped down to zero soon after entry into Phase II, a process which occurs at a calibrated ramp rate as noted above.

In a normal synchronous hybrid shift, i.e., one in which an asynchronous-to-synchronous shift is not commanded at step 102 of FIG. 2, the oncoming torque command ($T_{ONC}$) would typically ramp upward to an amplitude of $A_1+$ beginning at about $t_1$ of FIG. 3, i.e., when the oncoming clutch is synched and the clutch is filled, and would thereafter step to its maximum before about $t_2$ near the end of Phase I. The oncoming torque command would be maintained through Phases II and III as shown. When an asynchronous-to-synchronous shift is commanded, the controller 50 of FIG. 1 manages the synchronously-applied oncoming clutch such that the torque sources, for instance $TS_1$ and $TS_2$ of FIG. 1, effectively perform the torque transfer function simultaneously with an exhausting of the asynchronous offgoing clutch.

As a key part of the present control approach, the controller 50 enforces short-term and long-term torque limits on the synchronous oncoming clutch as noted above with reference to FIG. 2. The short-term (ST) limits are represented in FIG. 3 as traces $T_{ONC,ST}$ beginning shortly before $t_2$. In this example, $t_2$ is when |Sync clutch ST limit|>=|$(K_{Async}/K_{Sync})\times$ Async clutch load |, i.e., with "||" again representing absolute values, or in other words, when the synchronous clutch is ready to take the entire load from the asynchronous clutch in one control loop without affecting output torque (To). In the above relationship, $K_{Async}$ and $K_{Sync}$ describe constants. That is, after the synchronous clutch is applied, in the torque equation corresponding to that transmission state the output torque $T_O$ can be expressed as:

$$T_O = K_{ONC} \cdot T_{ONC} + K_{OFG} \cdot T_{OFG}$$

Likewise, the long-term (LT) limits are represented as traces $T_{ONC,LT(MAX)}$ and $T_{ONC,LT(MIN)}$. These short-term and long-term limits eventually merge just prior to entry into Phase III as shown, i.e., the synchronous torque application phase of the shift. The short-term and long-term limit merger always coincides with the moment in time at which the estimated torque of the asynchronous offgoing clutch ($T_{OFG,EST}$) reaches zero.

The controller 50 of FIG. 1 may calculate the short-term limits for the oncoming clutch as follows:

$$T_{ONC,ST} = T_{OFG,EST} * K$$

wherein K is the torque ratio of the oncoming and offgoing clutches $$\left(\frac{K_{ONC}}{K_{OFG}}\right),$$

i.e., the proportion of the output torque ($T_O$) load on the synchronous oncoming (ONC) clutch relative to the asynchronous offgoing (OFG) clutch. The torque exchange is delayed until the synchronous oncoming clutch is able to handle the entire offgoing torque load without adversely decreasing the output torque ($T_O$), as noted above. The controller 50 does not use separate delay logic, but rather delay occurs naturally as the LT limits for the synchronous clutch are +/-0 until $t_2$.

The controller 50 of FIG. 1 may calculate the long-term limits for the oncoming clutch as follows:

$$T_{ONC,LT}{}^{Max} = \text{Max}(0, (T_{ONC,ST}{}^{Max} - |K \times T_{OFG,EST}|))$$

$$T_{ONC,LT}{}^{Min} = \text{Min}(0, (T_{ONC,ST}{}^{Min} - |K \times T_{OFG,EST}|)).$$

When one substitutes 0 for the offgoing estimated torque ($T_{OFG,EST}$), the result is that the Min/Max LT limits equal the Min/Max ST limits, i.e., the limits converge exactly when the estimated torque/load goes to zero.

When confined within the LT limits (or riding them), the present approach allows for a shaping of a smooth output torque profile during a torque exchange. In some instances it may be necessary to go beyond the LT limits into the ST limits, e.g., in order to protect/limited by hardware as noted above. The choice as to whether or not to access these limits may be made with an eye to higher priorities such as preserving hardware, and thus the short term reserve may be tapped into only selectively, that is, on an as-needed basis. Most of the time, the controller 50 of FIG. 1 may simply operate within the LT limits.

By using the method 100 shown in FIGS. 2 and 2A in a hybrid electric vehicle, such as of the type shown in FIG. 1, selective enactment of an asynchronous offgoing-to-synchronous oncoming clutch shift is enabled for predetermined shifts. In this approach, as best shown in FIG. 3, the asynchronous offgoing clutch is offloaded while the synchronous oncoming clutch is simultaneously loaded. The enforcement of the short-term and long-term torque command limits described above commencing at or near the end of a period of asynchronous offgoing clutch control (Phase I), and continuing until the start of the synchronous torque application phase (Phase III) at $t_3$ of FIG. 3, i.e., when the offgoing asynchronous clutch is exhausted, may help to improve overall drive quality during shift events in which a driver requests continuous output torque through the duration of the shift. Likewise, drive quality may be improved via the control of slip, with the offgoing asynchronous clutch slip held constant in phase I, and then allowed to follow its target speed in phase II, albeit at a slower rate.

While the best modes for carrying out the invention have been described in detail, those familiar with the art to which this invention relates will recognize various alternative designs and embodiments for practicing the invention within the scope of the appended claims.

The invention claimed is:

1. A hybrid electric vehicle comprising:
   a plurality of torque sources;
   a transmission having:
      a gear set; and
      a plurality of clutches including an offgoing clutch and an oncoming clutch; and
   a controller in communication with the transmission and the torque sources, wherein the controller is configured to:
      determine a required continuous output torque through a duration of a torque exchange commanded via a requested shift; and in response to the required continuous output torque, the controller is configured to:
      synchronize and fill the oncoming clutch;
      estimate a hydraulic capacity of the oncoming clutch;
      temporarily expand a short-term torque capacity of the oncoming clutch during the duration of the torque exchange in response to a control objective having a threshold priority;
      delay onset of the torque exchange until the short-term torque capacity of the oncoming clutch is sufficient for receiving all torque load from the offgoing clutch without affecting the continuous output torque;
      asynchronously control the offgoing clutch through the duration of the torque exchange;
      synchronously control the oncoming clutch through the duration of the torque exchange; and
      load the synchronous oncoming clutch via an expanding set of long-control torque capacity limits as a function of a simultaneously exhausting the offgoing clutch load.

2. The vehicle of claim 1, wherein the vehicle includes an electric motor and an internal combustion engine as the plurality of torque sources, and wherein the controller is configured to offload the asynchronously controlled offgoing clutch to the synchronously controlled oncoming clutch using a combination of the electric motor and the engine while maintaining the output torque at a continuous level.

3. The vehicle of claim 1, further comprising a sensor operable to generate a throttle signal, wherein the controller is in communication with the sensor and is configured to determine, by processing the throttle signal, whether the continuous output torque is required.

4. The vehicle of claim 1, wherein the requested shift is a power-on shift through neutral.

5. The vehicle of claim 1, wherein the controller temporarily enforces the short-term torque capacity limits over the long-term torque capacity limits in response to the control objective having a threshold priority.

6. The vehicle of claim 5, wherein the short-term and long-term torque capacity limits merge prior to completing the torque exchange.

7. A transmission assembly for a hybrid electric vehicle having a plurality of torque sources, the transmission comprising:
   a gear set;
   a plurality of clutches, including an oncoming and an offgoing clutch, wherein the offgoing clutch has a torque load at the onset of a requested torque exchange having a duration; and
   a controller configured to selectively connect and disconnect some of the plurality of torque sources to the gear set via respective engagement and disengagement of the plurality of clutches, wherein the controller is configured to determine a required continuous output torque through a requested torque exchange, and in response to the required continuous output torque, to:
      synchronize and fill the oncoming clutch;
      estimate a hydraulic torque capacity of the oncoming clutch;
      apply, in response to a control objective having a threshold control priority, a set of short-term torque capacity limits which temporarily expand a torque capacity of the oncoming clutch during the torque exchange;
      delay the onset of the torque exchange until the estimated torque capacity of the oncoming clutch is capable of receiving all offgoing clutch load from the offgoing clutch without affecting the continuous output torque;
      asynchronously control the offgoing clutch through the duration of the torque exchange;
      synchronously control the oncoming clutch through the duration of the torque exchange; and
      load the synchronous oncoming clutch via expanding long-control torque capacity limits as a function of a simultaneously exhausting the offgoing clutch load.

8. The transmission of claim 7, wherein the vehicle includes an electric motor and an internal combustion engine as the plurality of torque sources, and wherein the controller is configured to offload the offgoing clutch using a combination of torque from the electric motor and the engine while maintaining the continuous output torque.

9. The transmission of claim 7, further comprising a sensor operable to generate a throttle signal, wherein the controller is in communication with the sensor and is configured to determine, by processing the throttle signal, whether the continuous output torque is requested.

10. The transmission of claim 7, wherein the requested shift is a power-on shift through neutral.

11. The transmission of claim 7, wherein the controller temporarily enforces the short-term torque capacity limits in lieu of the long-term torque capacity limits in response to the control objective having a threshold priority.

12. The transmission of claim 7, wherein the short-term and long-term torque capacity limits merge prior to completing the torque exchange.

13. A method for control of a hybrid electric vehicle having a plurality of torque sources, a gear set, a plurality of clutches, including an oncoming and an offgoing clutch, and a controller, the method comprising:

determining a continuous output torque is required through a requested torque exchange having a duration; and when the continuous output torque is required:
  synchronizing and filling the oncoming clutch;
  estimating a hydraulic torque capacity of the oncoming clutch;
  applying, in response to a control objective having a threshold control priority, a set of short-term torque capacity limits which temporarily expand a torque capacity of the oncoming clutch during the duration of the torque exchange;
  delaying the onset of the torque exchange until the estimated torque capacity of the oncoming clutch is capable of receiving all of a torque load from the offgoing clutch without affecting the output torque;
  asynchronously controlling the offgoing clutch through the duration of the torque exchange;
  synchronously controlling the oncoming clutch through the duration of the torque exchange; and
  loading the synchronous oncoming clutch via expanding long-control torque capacity limits as a function of a simultaneously exhausting the offgoing clutch load prior to or when the estimated torque capacity of the offgoing clutch reaches zero.

14. The method of claim 13, wherein the vehicle includes an electric motor and an internal combustion engine as the plurality of torque sources, further comprising: offloading the offgoing clutch using a combination of torque from the electric motor and the engine while maintaining the continuous output torque.

15. The method of claim 13, further comprising: enforcing the short-term torque capacity limits in lieu of the long-term torque capacity limits in response to the control objective having a threshold priority.

16. The method of claim 13, further comprising: merging the short-term and long-term torque capacity limits merge prior to completing the torque exchange.

\* \* \* \* \*